(12) United States Patent
Hofele et al.

(10) Patent No.: US 6,374,995 B1
(45) Date of Patent: Apr. 23, 2002

(54) POSITIONING SYSTEM HAVING A WEIGHT COMPENSATION ARRANGEMENT

(75) Inventors: Hans Hofele, Göppingen; Andreas Dangelmayr, Ottenbach; Jürgen Eltze, Göppingen; Karl Thudium, Wäschenbeuren, all of (DE)

(73) Assignee: Schuler Pressen GmbH & Co., Goeppingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,255

(22) Filed: Nov. 10, 1999

(30) Foreign Application Priority Data

Nov. 10, 1998 (DE) .......................... 198 51 743

(51) Int. Cl.[7] .............................................. B65G 25/00
(52) U.S. Cl. .............................. 198/750.12; 198/750.1; 198/750.11; 198/468.01
(58) Field of Search ........................ 198/750.1, 750.11, 198/750.12, 468.2, 468.4, 689.1, 468.6, 750.14, 468.01; 414/225.01, 752.01, 749.1

(56) References Cited

U.S. PATENT DOCUMENTS

| | | | |
|---|---|---|---|
| 3,991,885 A | * 11/1976 | Warren | 214/1 BV |
| 4,490,091 A | * 12/1984 | Brems | 414/749 |
| 4,496,280 A | * 1/1985 | Brems | 414/749 |
| 4,574,941 A | 3/1986 | Tsuge et al. | 198/468.2 |
| 4,806,070 A | * 2/1989 | Poux et al. | 414/752 |
| 4,807,456 A | * 2/1989 | Shiraishi et al. | 72/405 |
| 5,174,709 A | * 12/1992 | Blatt et al. | 414/567 |
| 5,215,181 A | * 6/1993 | Blatt | 198/468.2 |
| 5,337,594 A | * 8/1994 | Pettersson et al. | 72/446 |
| 5,359,875 A | * 11/1994 | Sova | 72/336 |
| 5,363,683 A | * 11/1994 | Thudium et al. | 72/405 |
| 5,452,981 A | 9/1995 | Crorey et al. | 414/225 |
| 5,598,733 A | * 2/1997 | Sova | 72/336 |
| 5,829,300 A | * 11/1998 | Sova | 72/336 |
| 5,842,370 A | 12/1998 | Hofele | |
| 5,899,108 A | 5/1999 | Hofele et al. | 72/405.1 |
| 5,967,291 A | * 10/1999 | Hansen | 198/409 |
| 5,992,207 A | * 11/1999 | Hofele et al. | 72/405.01 |
| 5,993,143 A | * 11/1999 | Eltze et al. | 414/752 |

FOREIGN PATENT DOCUMENTS

| | | |
|---|---|---|
| DE | 30 40 655 A1 | 5/1982 |
| DE | 32 18 450 | 11/1983 |
| DE | 44 18 417 | 11/1995 |
| DE | 19645790 | 5/1998 |
| DE | 196 54 474 A1 | 7/1998 |
| DE | 19654475 | 12/1998 |

OTHER PUBLICATIONS

European Search Report for EP 99 12 1917 (dated May 7, 2001).

* cited by examiner

Primary Examiner—Christopher P. Ellis
Assistant Examiner—Rashmi Sharma
(74) Attorney, Agent, or Firm—Crowell & Moring LLP

(57) ABSTRACT

A positioning system (31, 32, 33, 34 35, 36), particularly for transporting and positioning workpieces, has a drive and force generating transmission device (47) by means of which a carrier device (41) can be moved and positioned. At least one force generating device (70) is connected to the drive and force transmission device (47), which force generating device (70) feeds into the drive and transmission system of the drive and force transmission device (47), an additional force used for compensating the weight of the drive and force transmission device and its moved parts and possibly of a workpiece, to the extent that this force manifests itself at the drives of the drive and force transmission device (47).

12 Claims, 6 Drawing Sheets

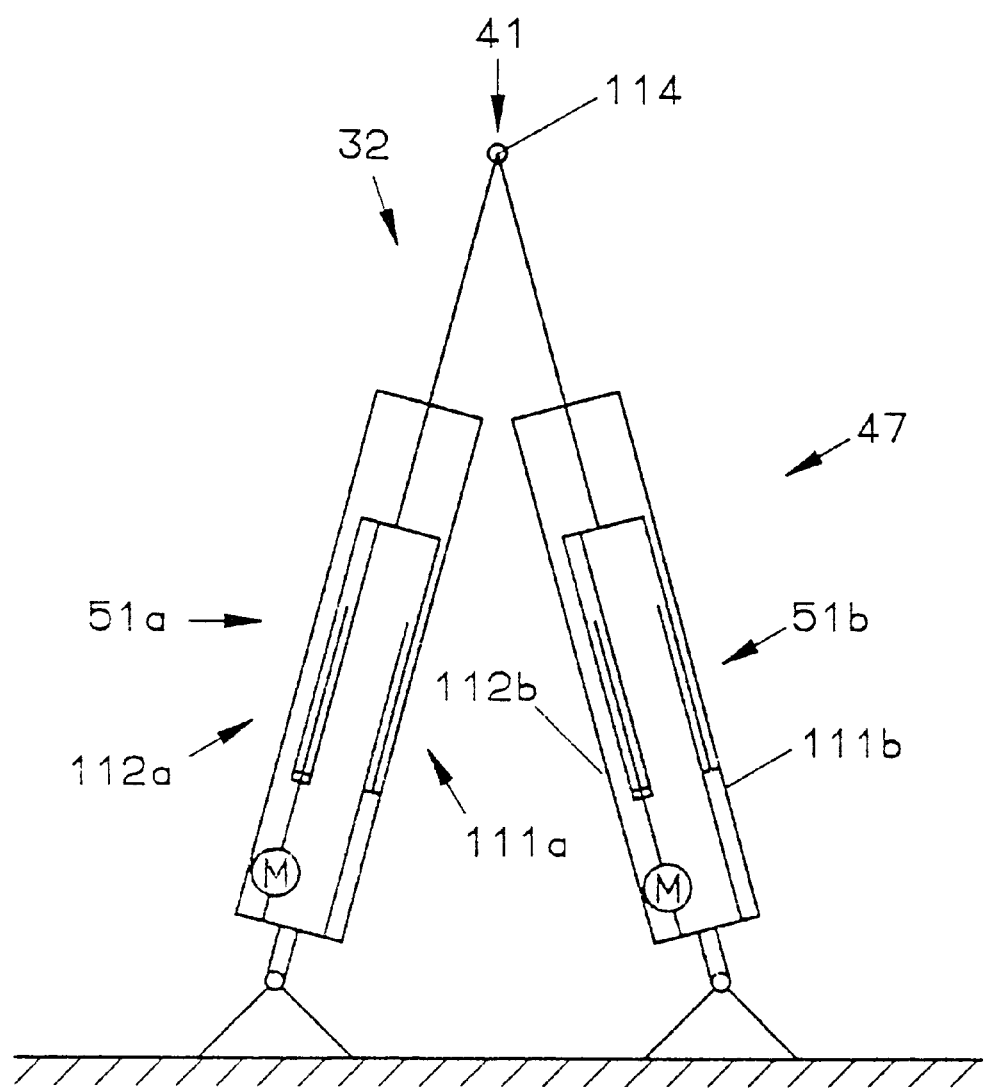

POSITIONING SYSTEM HAVING A WEIGHT COMPENSATION ARRANGEMENT

This application claims priority of DE 198 51 743.2, filed Nov. 10, 1998, the disclosure of which is expressly incorporated by reference herein.

The invention relates to a system for positioning and moving machine elements, particularly workpiece grippers or receiving devices, for the transport or handling of workpieces.

The machining of workpieces frequently requires transporting them between several machining stations, for example, between press stages. As a rule, the workpieces must be moved along a defined path. For this purpose, the workpieces are picked up by means of corresponding gripping or receiving devices and are moved from one station to another. In each station, the gripping or receiving devices release the workpiece and, optionally by way of a parked position, move back to the starting position in the machining station which is preceding in the machining sequence. The whole path covered by the gripping devices is called a transfer curve. For this purpose, it is known, for example, from German Patent document DE 4418417 A1 to provide, in the case of a transfer press, two mutually parallel transfer rails 3, on which travelling carriages are in each case disposed in a longitudinally displaceable manner. The transfer rails extend along a transport path which leads through all press stations. A cross traverse extends from a travelling carriage on one transfer rail to a travelling carriage on the other transfer rail. The travelling carriages are connected with driving devices by means of which these can be adjusted and driven in a targeted manner along the travelling rails. The transfer rails are coupled with stroke devices, which are capable of synchronously lifting and lowering the two transfer rails. By the superimposition of the lifting and lowering movement of the transfer rails and of the transfer movement of the travelling carriages, the transfer curve of the cross traverses is formed.

In addition, it is known, for example, from German Patent Document DE 3218450 A1 to transport sheet metal pieces by means of a gripper which can be swivelled about a vertical axis. The gripper has a telescope arm with a gripper head and, for the transport of pieces, swivels about a circular arc situated in a horizontal plane.

By means of such a device, curves can be generated which are situated in a horizontal plane; that is, the gripper head is moved within a horizontal plane. The drive of the gripper, which includes a swivel drive and a telescope drive, has to apply the force required for accelerating the sheet metal piece and for braking it. Because of the lateral arrangement of the swivelling axis, the swivel drive and the telescope drive are, however, free of weights.

If a curve situated in a vertical plane is to be travelled, that is, a curve which has a horizontal transport component as well as a vertical lifting and lowering component, the drives, which cause the lifting and lowering, must, additionally to the force required for accelerating the workpiece, apply a force for overcoming the force of its weight. This weight is also a function of the time and the position; that is, a gripper which is moving while it is empty generates a clearly lower weight than a gripper loaded by means of a workpiece. The drives must be designed for the maximal driving power to be transmitted to the gripper. As a result, they are correspondingly heavy and have a high weight.

It is an object of the invention to be able to use drives which are as light as possible.

This object is achieved in the case of a system which has the characteristics of claim 1.

According to the invention, in addition to the driving force, a compensation force is supplied to a drive and force transmission device, which is used for moving and positioning a carrier device, for compensating the force of the weight applied to the carrier device. This is advantageous particularly in the case of devices which have drives moved along by other axes. The force of the weight emanates from the carrier device, from the workpiece held at the carrier device and possibly from parts of the drive and force transmission device. If now, for example, the weight of the carrier device and of the moved-along part of the drive and force transmission device is compensated, only the weight of the workpiece will still be applied to the drive causing the vertical movement. The torque to be applied by the drive is correspondingly lower and so is the required power. In addition, the friction in a transmission arranged between the drive and the carrier device may possibly be reduced.

When the workpiece is deposited, the compensation force in the vertical direction additionally introduced into the drive and force transmission device causes a complete weight compensation. In addition, a slight overcompensation, for example, by half the workpiece load may also be possible. However, the drive which can apply the same power for the path section of the carrier device without any workpiece as in a path section with a workpiece, in this case, is within its power limit. The compensation of approximately half the amount of the weight of the workpieces and the almost complete compensation of the weight resulting from the parts of the positioning device itself which would act upon the drive without the compensation, results in a reduction of the maximal forces acting upon the drive and in a time-related uniformity of the amounts of the forces. The drive on the whole can be designed for lower power and therefore becomes smaller and lighter.

The force generating device can be arranged to be acting in parallel to the mechanical driving device of the positioning system. A flow of force therefore exists from one or several driving motors to the carrier device. The path of the flow of force is formed by suitable transmissions, which may also include lever mechanisms. The compensation force of the force generating device is supplied directly to the carrier device or to a suitable point in the force transmission path from the drive or drives to the carrier device. As required, the force generating device may also be coupled directly to the driving device.

Particularly if applied directly to the carrier device, the force generating device can generate a time-constant compensation force and transmit it to the carrier device. The force of the force generating device may be adjustable in order to permit an adaptation to different workpiece weights.

Furthermore, it is possible to construct the force generating device such that it can generate a time-variable compensation force. This is possible, for example, by means of pneumatic cylinders, whose internal pressure is controlled as a function of the path and/or the time by suitable solenoids by way of a control unit. As a result, it is possible, beyond the above-mentioned approximation-type compensation of the workpiece weight, to vary the compensation force for the transport stroke and the empty stroke, so that the weight component still occurring at the drive is almost completely compensated. In addition, it is therefore possible to compensate the weight in the case of those positioning systems, in the case of which the component of the weight acting upon the drive changes as a function of the position. This may occur, for example, in the case of swivel arms which can be swivelled about one or several horizontal axes. When the swivel arm is swivelled out of its vertical line, the weight applied to the swivel arm causes a swivelling moment whose preceding sign depends on the swivelling direction. When the swivel arm is in its vertical position, no swivelling moment will occur. With an increasing inclination of the arm and, if the arm can be telescoped, with its increasing length, the swivelling moment becomes larger. The compensation, which ideally is to be carried out as an upwardly acting vertical force at the carrier device, can in many cases not be carried out easily from above. If the weight on the swivel arm, on its bearing or a moved-along telescope drive is compensated, it is advantageous for the compensating force to be controllable.

The weight compensation is conceivable in the case of different drive kinematics. The positioning system may, for example, have one or two swivel arms which extend, for example, in parallel to one another and which, at the end side, are connected by a cross traverse with the workpiece gripping devices, for example, suction devices. In an advantageous embodiment, the swivel arms may be swivellably disposed at their respective other end on a slide block which is in each case vertically displaceably disposed at a press stand or at another frame device. The adjustment of the swivelling position of the swivel arm can be carried out by two guide rods which meet in the center on the swivel arm at an articulation and which, in turn, are disposed in an articulated manner on the slide block. These slide blocks are driven and therefore define the vertical position and the swivelling position of the swivel arm. The force generating device may be a pneumatic device which acts upon a fourth slide block displaceably disposed in the vertical direction. The fourth slide block is again connected with the swivel arm by way of a guide rod. The force of the weight applied to the carrier can therefore be compensated relatively precisely for all swivelling positions within a working range of the positioning system, without the requirement that the force generating device would have to adjust the introduced force.

Furthermore, it is possible to spatially define the horizontal axis of the swivel arm and to drive the swivel arm, for example, by way of a linkage or a rotary drive. As the result of an additional telescoping capacity of the swivel arm, it is again possible to travel through almost arbitrary transfer curves. The rotary drive as well as the telescope drive may be separately connected with a force generating device which generates a compensation force which differs according to the swivelling position and the telescoping position.

Instead of taking place at a fixed axis or a linear guide, the guide of the supported end of the swivel arm can also be formed by another guide, for example, by a cycloidal guide.

Details of advantageous embodiments of the invention ar contained in the drawing, the description and/or the subclaims.

Embodiments of the invention are illustrated in the drawing.

FIG. 1 is a cutout-type perspective view of several successive working stations of a transfer press with transfer units which each have a separate driving device and a separate weight compensation device;

FIG. 2 is a schematic perspective view of an individual transfer unit of the transfer system illustrated in FIG. 1 which is formed by several transfer units;

FIG. 3 is a schematic perspective view of several working stations of a transfer press which are linked with one another by weight-compensated transfer units of a modified embodiment;

FIG. 4 is a diagrammatic perspective basic view of a modified embodiment of a transfer unit;

FIG. 5 is a schematic lateral view of another embodiment of a transfer unit; and FIG. 6 is a view of a transfer system with two interacting telescopable struts which each separately have a driving device and a force generating device for compensating the force of weight.

With respect to the workpiece transport, the individual press stations 2, 3, 4, 5, 6 are linked by transfer units 31, 32, 33, 34, 35, 36, which are each controlled separately and can thus operate independently of one another. The transfer units 31 to 36 have identical constructions. The following description of the transfer unit 32 by means of FIG. 2 therefore applies correspondingly to the other transfer units 31 and 33 to 36.

Figure 2:
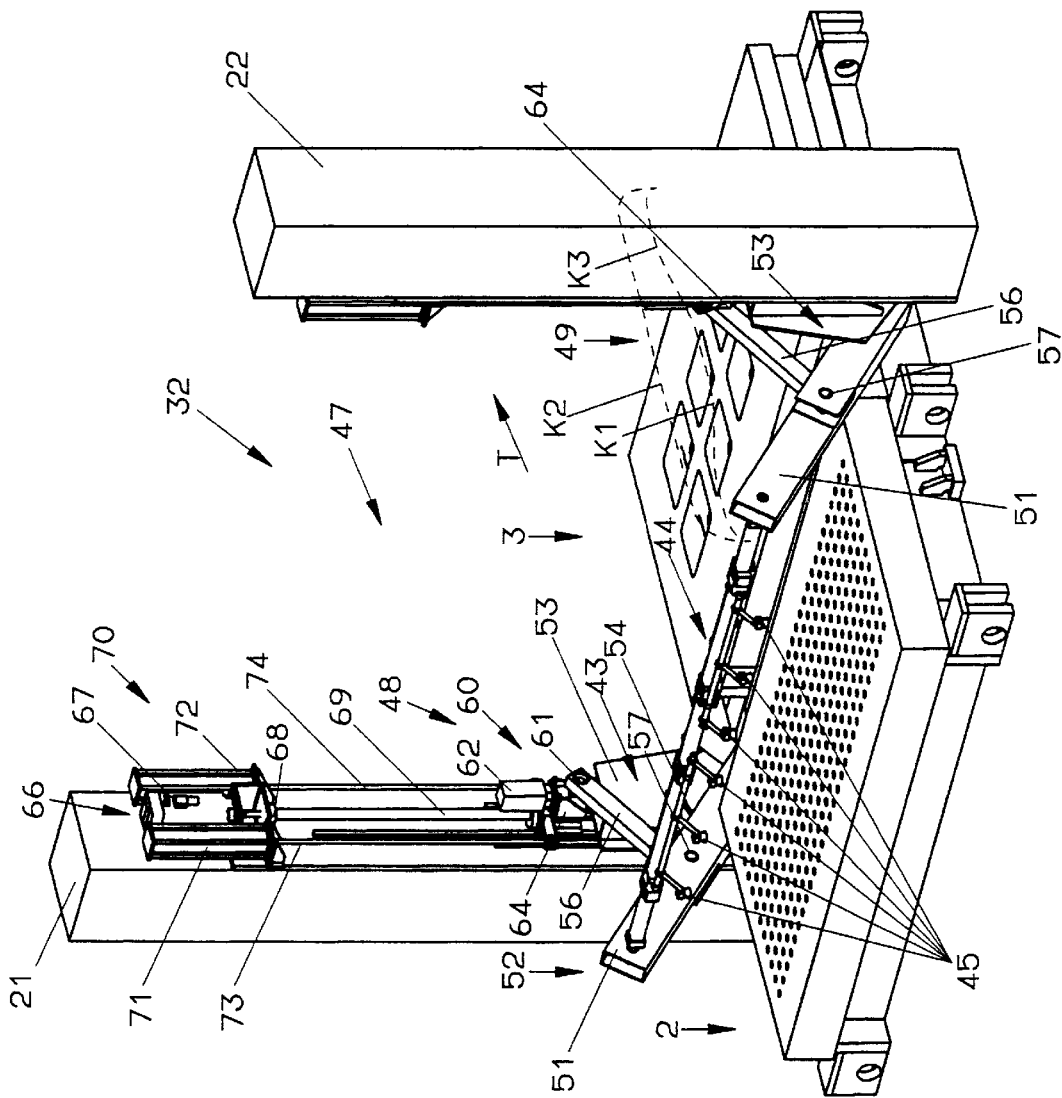

The transfer unit 32 illustrated in FIG. 2 has a carrier device 41 for the piece transport between the working station 2 situated in front and the working station 3 situated behind, which carrier device 41 is formed by a cross traverse 42 and suction spiders 43, 44 carried by the cross traverse 42. The carrier device is therefore formed by a suction bridge, on which the individual vacuum suction devices 45 have the purpose of receiving sheet metal pieces in a targeted manner and releasing them again.

Figure 1:
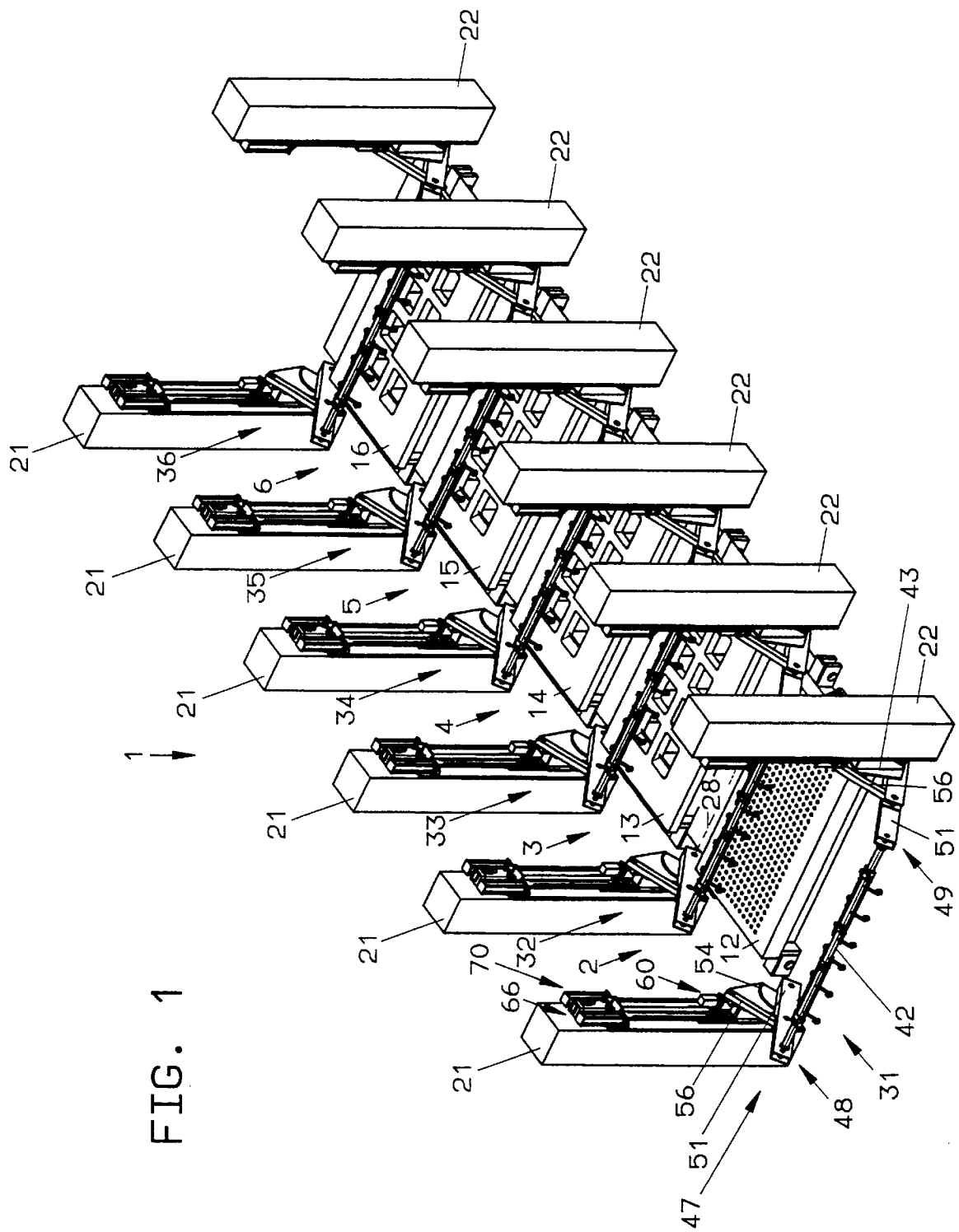
FIG. 1 illustrates a transfer press 1 by means of it s working stations 2, 3, 4, 5, 6, of which only one sliding table 12, 13, 14, 15, 16 respectively for receiving the tool is illustrated. At both sides of the row formed by the sliding tables 12, 13, 14, 15, 16, press stands 21, 22 are in each case set up to fill gaps with the sliding tables 12, 13, 14, 15, 16. Sufficient space exists in each case between the stands 21, in order to be able to move a sliding table through. The same applies to the press stands 22.

The cross traverse 42 is carried by a driving and force generating device 47, which includes to drive and force transmission units 48, 49. The drive and force transmission unit 48 is constructed as a guide rod mechanism and is connected with the end of the cross traverse 42 which is on the left in FIG. 2, while the drive and force transmission unit 49 is coupled with the end on the right side. The drive and force transmission units 48, 49 are constructed symmetrically with respect to a vertical plane imagined in the transport direction. The following description of the drive and force transmission device 48 therefore applies correspondingly to the drive and force transmission device 49. In FIGS. 1 and 2, these are therefore provided with the same reference numbers without any separate reference.

The drive and force transmission unit 48 has a swivel arm 51 which, at its free end 52, disposes in a fixed manner or holds one end of the cross traverse 42 swivellably or rotatably about its longitudinal axis. The cross traverse 42 is aligned essentially perpendicularly to the swivel arm 51 and transversely to a transport direction T, which is defined by the sequence of the working stations 2, 3, 4, 5, 6.

At its end situated away from the end 52 of the cross traverse, the swivel arm 51 is disposed on a slide block 53 which, for supporting the swivel arm 51, may be provided with a curved guide 54. The slide block 53 is vertically displaceably disposed on the press stands 21 (22). It is provided with no driving device and can therefore be freely displaced. A linear guide is used for its bearing. However, as required, another guide, for example, a curved guide may also be provided.

For driving the swivel arm 51, a guide rod 56 is used which is connected approximately in the center at an articulation 57 with the swivel arm 51. By means of its other end, the guide rod 56 is held on a rotary drive 60, whose output is formed by a shaft end 61 which is non-rotatably connected with the guide rod 56. The rotary drive 60 has a driving motor 62 which acts by way of a corresponding reduction and angular transmission onto the shaft end 61. The driving motor 62 is controlled by a control unit which is not shown in detail. This driving motor 62 can be constructed as a servo motor. In the case of a preferred geometry, the guide rod 56 is as long as half the swivel arm and is guided in precisely in the center.

The rotary drive 60 is carried by a slide block 64 which is linearly displaceably disposed in parallel tot he slide block 53. However, as required, the guides may also be arranged at an angle with respect to one another. In contrast to the slide block 53, the slide block 64 is not freely movable but is fixed in its vertical position by way of an actuator 66. The actuator 66 has a servo motor 67 which may be controlled by the same control unit as the driving motor 62. By way of a reduction gear and another transmission, which converts the rotating movement of the servo motor 67 into a linear movement, such as a spindle stroke transmission 68 and a transmission rod 69, the actuator 66 is connected with the slide block 64. The vertical position of the slide block 64 and thus of the shaft end 61 and the swivelling position of the guide rod 56 defined by the rotary drive clearly determine the point at which the articulation 57 is situated. This also defines the swivelling position of the swivel lever 51 and thus the position of the cross traverse 42. By means of a suitable control of the driving motor 62 and of the servo motor 67, a desired transfer curve can be travelled in a targeted manner.

In addition to the actuator 66, a force generating device 70 is applied to the slide block 64. This force generating device 70 includes two pneumatic cylinders 71, 72 which each provide a, for example, constant tension force on a tie rod 73 which tension force is directed vertically upward. The tie rods 73, 74 are each connected with the slide block 64. The tension force is a function of the air pressure present in the pneumatic cylinders 71, 72. This air pressure is at least adjustable; it can preferably be controlled by the control device which is not shown in detail. However, the air pressure is essentially independent of the vertical position of the tie rods 73, 74 and thus of the slide block 64.

The force generating device 70 acts upon the slide block 64 by means of a vertically upward-directed force which corresponds to the weight of the drive and force generating device 48 plus half of the expected workpiece weight.

The transfer unit 32 described so far operates as follows:

It is assumed that, at the start of the working play, the two swivel arms 51 are in a vertical position. The guide rods 56 are each swivelled in a vertically downward-directed position and the slide blocks 64 are in a vertical position which marks a parking position of the cross traverse 42; that is, this cross traverse is set to an appropriate height. When the tools arranged in front and behind are now opened up, the driving motors 62 are controlled such that both guide rods 56 swivel to the machining station 2. Simultaneously, the servo motors 67 are controlled such that the change of the height of the cross traverse 42 resulting from the occurring swivelling of the swivel arms 51 is essentially compensated and a possibly desired superimposed stroke movement is carried out. As a result, a first curve section K1 is travelled by means of the cross traverse 42 (FIG. 2). After a workpiece is received at the suction devices 45, the driving motors 62 and the servo motors 67 are now controlled such that a transfer curve section K2 is travelled. The force of the weight of the workpiece which is now applied to the cross traverse is compensated by half by the force generating devices 70. Although the servo motors 67 and the driving motors 62 must therefore apply the acceleration force required for the workpiece, the power required for overcoming its weight force is reduced by half or at least is clearly reduced.

After the workpiece is deposited in the machining station 3, as the result of the appropriate controlling of the servo motors 67 and of the driving motors 62, the curve route K3 is finally travelled. Like the curve section K1 this curve route K3 is an empty stroke without any loading of the cross traverse 42 by the workpiece. The drives are relieved from the weight of drives and transmission parts moved along. Only inertia forces and the workpiece weight must be overcome. This force is within the power range of the drives which therefore, while the transport dynamics are the same, may clearly have a lighter construction than without the compensation of weight by the force generating device 70. This is significant particularly in view of the actuator 60 which must be lifted and lowered by the stroke unit 66. If this weight is compensated, the power and weight expenditures at the stroke drive also become lower. Under certain circumstances, it is only the illustrated measure which makes it possible to implement the required dynamics. While the driving powers are low, the introduced positioning system therefore has good dynamics, a high positioning speed and a good positioning precision. In addition to being used in transfer systems, it can also be used in other applications.

Figure 3:
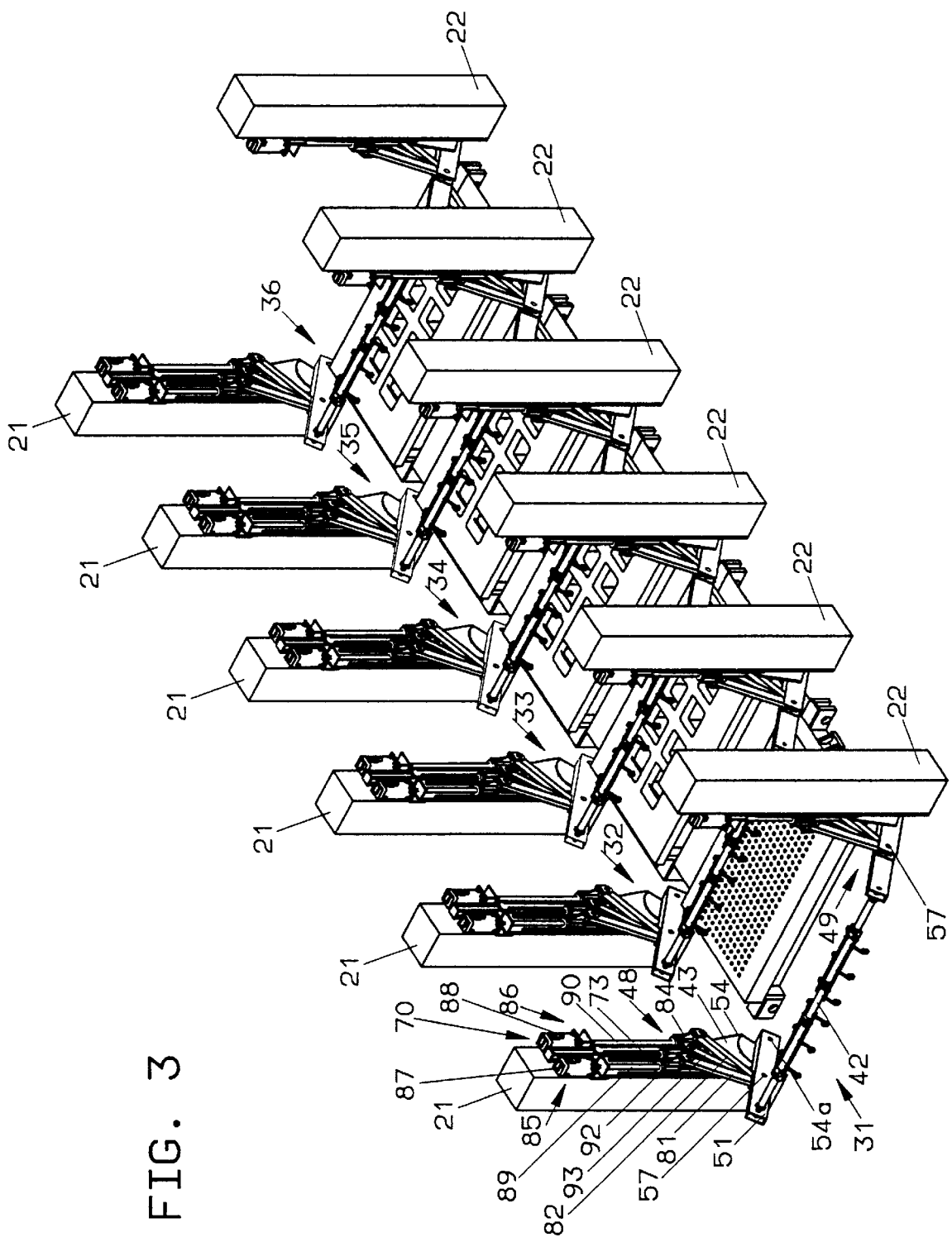

A modified embodiment of the transfer units 31, 32, 33, 34, 35, 36 is illustrated in FIG. 3 and will be described in the following by means the first transfer unit 31 of FIG. 3. The other transfer units 32 to 36 have the same constructions, so that the description applies correspondingly without further explanations. Reference numbers used in the following description which correspond to reference numbers in the above description indicate parts of the same construction and/or function.

The cross traverse 42 is carried by the drive and force transmission system 47, whose left drive and force transmission unit 48 is constructed as a guide rod transmission in constructionally the same manner as the right drive and force transmission unit 49, but mirror-symmetrically thereto.

The drive and force transmission device 48 has a slide block 43 which is freely displaceably disposed in the vertical direction and on which the swivel arm 51 is swivellably disposed. For this purpose, the curved guide 54 is used in conjunction with a bearing pin 54. Two guide rods 81, 82 are applied to the articulation 57 and enclose an acute angle with one another. At their respective end away from the articulation 57, the guide rods 81, 82 are each swivellably held on a linear slide block 83, 84. The slide block guides of the linear slide blocks 83, 84 are aligned in parallel to one another. As required, they may also enclose an angle with one another or be constructed as curved guides.

The linear slide blocks 83, 84 are connected with linear drives 85, 86 which, in the present embodiment, are formed by servo motors 87, 88 in conjunction with transmissions, such as spindle stroke mechanisms 89, 90. The latter convert the rotating movement of the servo motors 87, 88 to linear movements which are imparted on the linear slide blocks 83, 84.

For the compensation of the weight of the drive and force transmission device 47 and possibly of the weight or of half the weight of the workpiece carried thereby, the force generating device 70 is used. This force generating device 70 includes the pneumatic cylinder 71 which acts by means of its tie rod 73 onto a linearly displaceably disposed slide block 92. By way of a guide bar 93, this slide block 92 is connected with the swivel arm 51. The guide rod 93 can lead to the articulation 57 or to an articulation point arranged in the proximity thereof.

The drive and force generating (transmission) device 47 described so far defines the point in space at which the articulation 57 is situated by an interaction of the two servo motors 87, 88. This also clearly defines the swivelling position of the swivel arm 51 and its vertical position. In any swivelling position of the swivel arm 51, the force generating device 70 takes over a large portion of the weight of the drive and force generating (transmission) device 47 and optionally also a portion o the weight of the workpiece to be transported.

Figure 4:
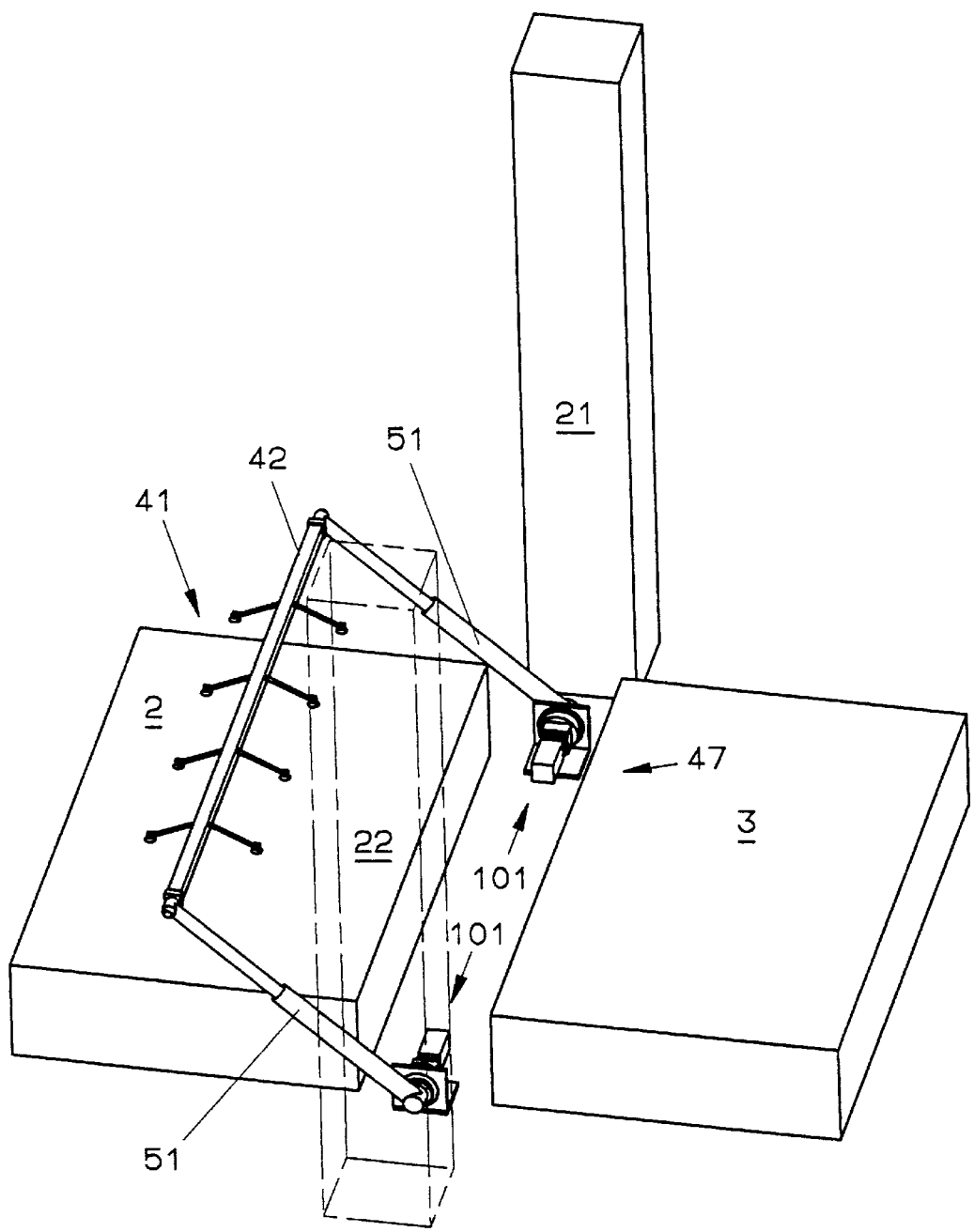

A modified embodiment of the drive and force transmission device 47 is illustrated in FIG. 4. While the swivelling arms 51 of the above-described embodiments are not necessarily but preferably constructed at a fixed length, that is, they cannot be telescoped, the swivel arms 51 of the embodiment of the drive and force generating (transmission) device 47 illustrated in FIG. 4 can be telescoped and are provided with telescope drives which are swivelled along with the swivel arms 51 and are arranged in their interior space. The swivel arms 51 are swivellably disposed about a transverse axis which is defined in its vertical position by vertically adjustable swivel drives 101. Force generators, which are not illustrated in detail, are assigned to the telescope drives of the swivel arms 51 as well as to the swivel drives 101. While telescope drives and the swivel drives 101 each define the position of the swivel arm and the length thereof, the force generators feed a controllable force in parallel to the respective drive into the system. The force is defined as a function of the position and by the computer-assisted control device such that, in each swivelling position and in each telescoping position, the weight acting upon the respective drives is approximately compensated. When, in the vertical position of the swivel arms 51, the weight acts essentially exclusively onto the telescope drives, these telescope drives, when the telescope arms 51 change more and more into the horizontal position, are increasingly relieved, the weight then appearing as a torque at the rotary drives 101. The force generators control against this torque corresponding to the position of the cross traverse 42.

In the case of all introduced drive and force generating (transmission) devices 47, the cross traverse 42 is held by means of its ends in a rotatable manner at the swivel arms 51. For determining and defining the rotating position of the cross traverse 542, which is also called the tilting position, about the transverse axis (longitudinal axis of the cross traverse 42), a suitable drive can be provided in the swivel arm 51. In the simplest case, this is a toothed belt which meshes with a toothed belt wheel non-rotatably connected with the cross traverse 42 and moves over a toothed belt wheel provided at the other end of the swivel arm 51. If this lower toothed-belt wheel is arranged in a non-rotatable manner, the cross traverse 42, when travelling through the transfer curve, carries out no swivelling or tilting movement. If such a swivelling or tilting movement is desired, a separate drive can be provided, for example, for the lower toothed-belt wheel.

Figure 5:
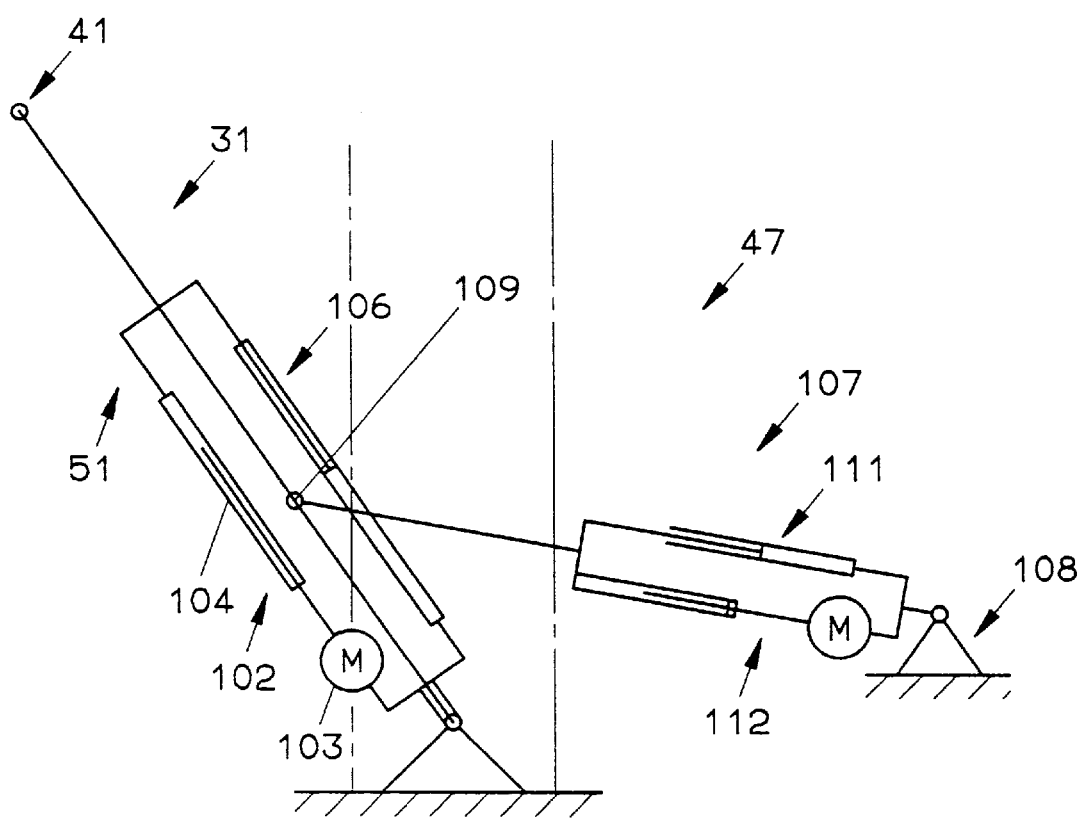

Another embodiment of the weight-compensating drive and force generating (transmission) device 47 is schematically illustrated in FIG. 5. The swivel arm 51 constructed as a longitudinally adjustable strut has a linear actuator 102 which is formed, for example, by a motor 103 and a connected spindle stroke mechanism 104. In parallel to this driving device formed by the linear actuator 102, a pneumatic cylinder 106 is arranged whose internal pressure is adjusted by the control device by way of suitable valves, such as solenoids or controllable throttles. The force emitted by the pneumatic cylinder 106 is controlled such that it corresponds essentially to the longitudinal force acting upon the swivel arm 51. Thus, with respect to its power, the motor 103 must be designed only for a portion of the driving power to be used. While the pneumatic cylinder 106 takes over the force, the motor 103 determines the precise position.

For defining the swivelling position of the swivel arm or swivel lever 51, a strut 107 is used which in principle has the same construction and which is arranged between a fixed point 108 and an articulation point 109 provided at the swivel arm 51. The strut 107 consists of a parallel arrangement consisting of a force generator 111 and of an actuator 112. While the force generator 111 applies the required force, the positioning drive 112 takes over the defining of the precise positioning. Both takes place under the control of the control device as a function of the position.

Another embodiment of a drive and force transmission unit constructed as a guide rod mechanism is illustrated in FIG. 6. The drive and force transmission device 47 is formed by two longitudinally adjustable swivel arms 51a, 51b which are swivellably disposed at the end side at fixed points and are connected in an articulated manner with one another at the end order side at an articulation 114. A force generator 111 (a, b) and a positioning device 112 (a, b), which act in parallel, are arranged in each swivel arm 51a, 51b which have a completely identical construction. The force generators 111a and 111b are controlled by the control device independently of one another such that the fraction of the weight applying to them in each case is compensated. Correspondingly, the two positioning devices 112a, 112b are free of forces and only take over the precise positioning.

A positioning system 31, 32, 33, 34 35, 36, particularly for transporting and positioning workpieces, has a drive and force transmission device 47 by means of which a carrier device 41 can be moved and positioned. At least one force generating device 70 is connected to the drive and force transmission device 47, which force generating device 70 feeds into the drive and transmission system of the drive and force transmission device 47, an additional force used for compensating the weight of the drive and force transmission device and its moved parts and moved parts and possibly of a workpiece, to the extent that this force manifests itself at the drives of the drive and force transmission device 47.

What is claimed is:

1. System for positioning and moving machine elements, particularly workpiece gripping devices or receiving devices, for transporting or handling workpieces, having a drive and force transmission device which contains at least one mechanical driving device and which carries a carrier device which can be moved and positioned by the drive and force transmission device between two mutually spaced sites, having at least one force generating device which is connected to the drive and force transmission device in order to transmit a force having a vertical component, for an at least approximate compensation of weight emanating from the drive and force transmission device, the carrier device (42) and possible workpieces, to the drive and force transmission device.

2. System according to claim 1, wherein the drive and force generating device is arranged for acting in parallel with the mechanical driving device.

3. System according to claim 1, wherein the drive and force transmission device contains at least one swivel arm which, at one end, is connected with the carrier device and is disposed to be swivellable about a horizontal axis.

4. System according to claim 3, wherein the horizontal axis of the swivel arm is defined by a bearing device which is disposed on a guide.

5. System according to claim 4, wherein the guide is a linear guide.

6. System according to claim 1, wherein the swivel arm is longitudinally adjustable.

7. System according to claim 1, wherein the drive and force transmission device includes two swivel arms which are guided at a distance in parallel to one another and which are connected with one another by the carrier device.

8. System according to claim 1, wherein the carrier device has an oblong construction and is moved by the drive and force transmission device transversely to a longitudinal course thereof.

9. System according to claim 3, wherein at least one force generating device is assigned to each of the at least one swivel arm.

10. System according to claim 1, wherein one force generating device respectively is assigned to each driving device.

11. System according to claim 1, wherein the force generating device has a characteristic force-path curve which during operation cannot be varied with respect to time.

12. System according to claim 1, wherein the force generating device is configured to generate a constant force.

* * * * *